(12) United States Patent
Katsuta

(10) Patent No.: US 10,061,908 B2
(45) Date of Patent: Aug. 28, 2018

(54) PROGRAM EDITING DEVICE, PROGRAM MANAGEMENT DEVICE, AND COMPUTER READABLE MEDIUM

(71) Applicant: MITSUBISHI ELECTRIC CORPORATION, Tokyo (JP)

(72) Inventor: Takao Katsuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 153 days.

(21) Appl. No.: 15/122,117

(22) PCT Filed: Jun. 11, 2014

(86) PCT No.: PCT/JP2014/065450
§ 371 (c)(1),
(2) Date: Aug. 26, 2016

(87) PCT Pub. No.: WO2015/189931
PCT Pub. Date: Dec. 17, 2015

(65) Prior Publication Data
US 2017/0017780 A1 Jan. 19, 2017

(51) Int. Cl.
*H04L 29/06* (2006.01)
*G06F 21/31* (2013.01)
*G06F 8/30* (2018.01)
*G06F 21/62* (2013.01)

(52) U.S. Cl.
CPC ............ *G06F 21/31* (2013.01); *G06F 8/30* (2013.01); *G06F 21/6209* (2013.01); *G06F 21/6218* (2013.01)

(58) Field of Classification Search
CPC ..................................................... G06F 21/31
See application file for complete search history.

(56) References Cited

U.S. PATENT DOCUMENTS

| | | | |
|---|---|---|---|
| 7,810,164 B2 | 10/2010 | Hiroi et al. | |
| 8,392,718 B2 | 3/2013 | Jinkawa et al. | |
| 8,843,886 B2 | 9/2014 | Fox et al. | |

(Continued)

FOREIGN PATENT DOCUMENTS

| | | |
|---|---|---|
| JP | 10-143469 A | 5/1998 |
| JP | 2000-105746 A | 4/2000 |

(Continued)

*Primary Examiner* — Shawnchoy Rahman
(74) *Attorney, Agent, or Firm* — Birch, Stewart, Kolasch & Birch, LLP

(57) ABSTRACT

A management server (200) has a storage section to store a program set (110) and a user management table. The management server receives user information from a development computer (300), authenticates a user on the basis of the received user information and user information included in the user management table, and transmits the program set to the development computer. The development computer edits a source program included in the program set, registers user information in the program set, and transmits the program set to the management server. The management server receives the program set, updates the program set stored in the storage section with the received program set, and updates the user information included in the user management table with the user information included in the received program set.

6 Claims, 17 Drawing Sheets

(56) References Cited

U.S. PATENT DOCUMENTS

| | | | |
|---|---|---|---|
| 8,880,660 B2 | 11/2014 | Miyazawa et al. | |
| 2003/0077067 A1* | 4/2003 | Wu | G11B 27/031 |
| | | | 386/218 |
| 2004/0117386 A1* | 6/2004 | Lavender | G06F 21/6236 |
| 2006/0101525 A1 | 5/2006 | Hiroi et al. | |
| 2007/0079370 A1 | 4/2007 | Jinkawa et al. | |
| 2007/0294756 A1* | 12/2007 | Fetik | G06F 21/552 |
| | | | 726/11 |
| 2008/0320471 A1* | 12/2008 | Maeda | G05B 19/406 |
| | | | 717/178 |
| 2009/0067686 A1* | 3/2009 | Boshra | G06F 21/32 |
| | | | 382/124 |
| 2011/0113340 A1 | 5/2011 | Miyazawa et al. | |
| 2012/0204143 A1 | 8/2012 | Fox et al. | |
| 2013/0239087 A1 | 9/2013 | Fox et al. | |
| 2013/0245792 A1 | 9/2013 | Anzai et al. | |

FOREIGN PATENT DOCUMENTS

| | | |
|---|---|---|
| JP | 2001-92782 A | 4/2001 |
| JP | 2002-189508 A | 7/2002 |
| JP | 2006-139523 A | 6/2006 |
| JP | 2007-122695 A | 5/2007 |
| JP | 2007-280348 A | 10/2007 |
| JP | 2008-33570 A | 2/2008 |
| JP | 2008-176544 A | 7/2008 |
| JP | 2011-107752 A | 6/2011 |
| JP | 2011-165041 A | 8/2011 |
| JP | 2013-175098 A | 9/2013 |
| KR | 20020016162 A | 3/2002 |
| KR | 20020022660 | 3/2002 |
| TW | I435192 B | 4/2014 |

\* cited by examiner

280: USER MANAGEMENT TABLE

| USER ID | USER PW | CTRL ID | AUTHENTICATION FLAG | ... |
|---------|---------|---------|---------------------|-----|
| USER0001 | PWaaaa | – | 0 | ... |
| : | : | | : | : |

112: USER MANAGEMENT TABLE

| USER ID | USER PW | CTRL ID | PERMISSION FLAG | VALID FLAG | UPDATE FLAG | ... |
|---|---|---|---|---|---|---|

112: USER MANAGEMENT TABLE

| USER ID | USER PW | CTRL ID | PERMISSION FLAG | VALID FLAG | UPDATE FLAG | ... |
|---|---|---|---|---|---|---|
| ID0001 | PWbbbb | - | 0 | 0 | 1 | ... |

112: USER MANAGEMENT TABLE

| USER ID | USER PW | CTRL ID | PERMISSION FLAG | VALID FLAG | UPDATE FLAG | ... |
|---|---|---|---|---|---|---|
| ID0001 | PWbbbb | CTRL 0001 | 0 | 0 | 1 | ... |

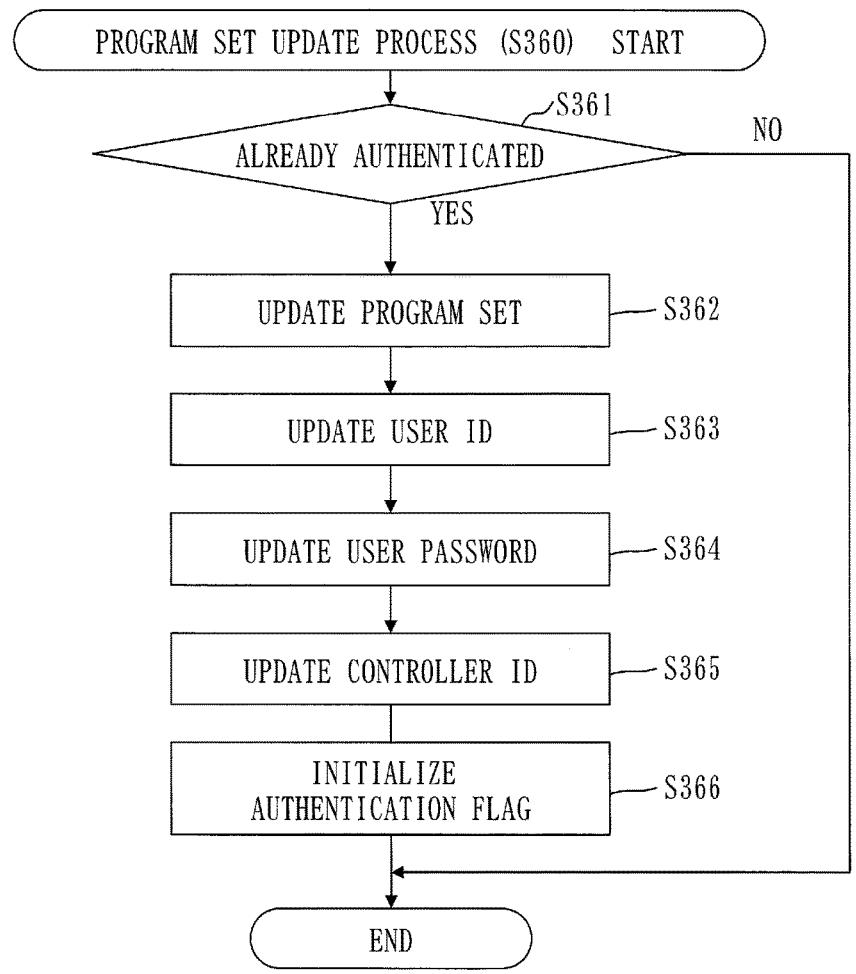

PROGRAM EDITING DEVICE, PROGRAM MANAGEMENT DEVICE, AND COMPUTER READABLE MEDIUM

TECHNICAL FIELD

The present invention relates to management of a program.

BACKGROUND ART

Recently, there is provided a system according to which a control program of a programmable logic controller (PLC) is managed by a server and the control program managed by the server can be edited via a network.

A user inputs account information required for editing the control program to the server. If authentication succeeds, the control program can be downloaded, inspected, and edited. This eliminates the need to usually store the control program in a client terminal, thus making it possible to prevent leakage of the control program. However, this method cannot be used in an environment where a network cannot be used.

Patent Literature 1 discloses a method according to which a control program is made to operate only in a specific PLC.

CITATION LIST

Patent Literature

Patent Literature 1: JP 2011-165041 A

SUMMARY OF INVENTION

Technical Problem

It is an object of the present invention to protect a program from an unauthorized person.

Solution to Problem

A program editing device according to the present invention includes:

a program set storage section to store a program set including a program, a user identifier, and a user password associated with the user identifier;

a user information acquisition section to acquire an authentication identifier of a user and an authentication password of the user;

a user authentication section to authenticate the user when the authentication password acquired by the user information acquisition section is same as a user password associated with a same user identifier as the authentication identifier acquired by the user information acquisition section; and a program editing section to edit the program included in the program set on a basis of an instruction from the user when the user has been authenticated by the user authentication section.

Advantageous Effects of Invention

According to the present invention, a program can be protected from an unauthorized person.

BRIEF DESCRIPTION OF DRAWINGS

FIG. 23 is a flowchart of a program set update process (S360) according to the first embodiment;

FIG. 24 is a diagram illustrating an example of the user management table 280 of the management server 200 according to the first embodiment.

DESCRIPTION OF EMBODIMENTS

First Embodiment

A program management system to manage a program will be described.

Figure 1:
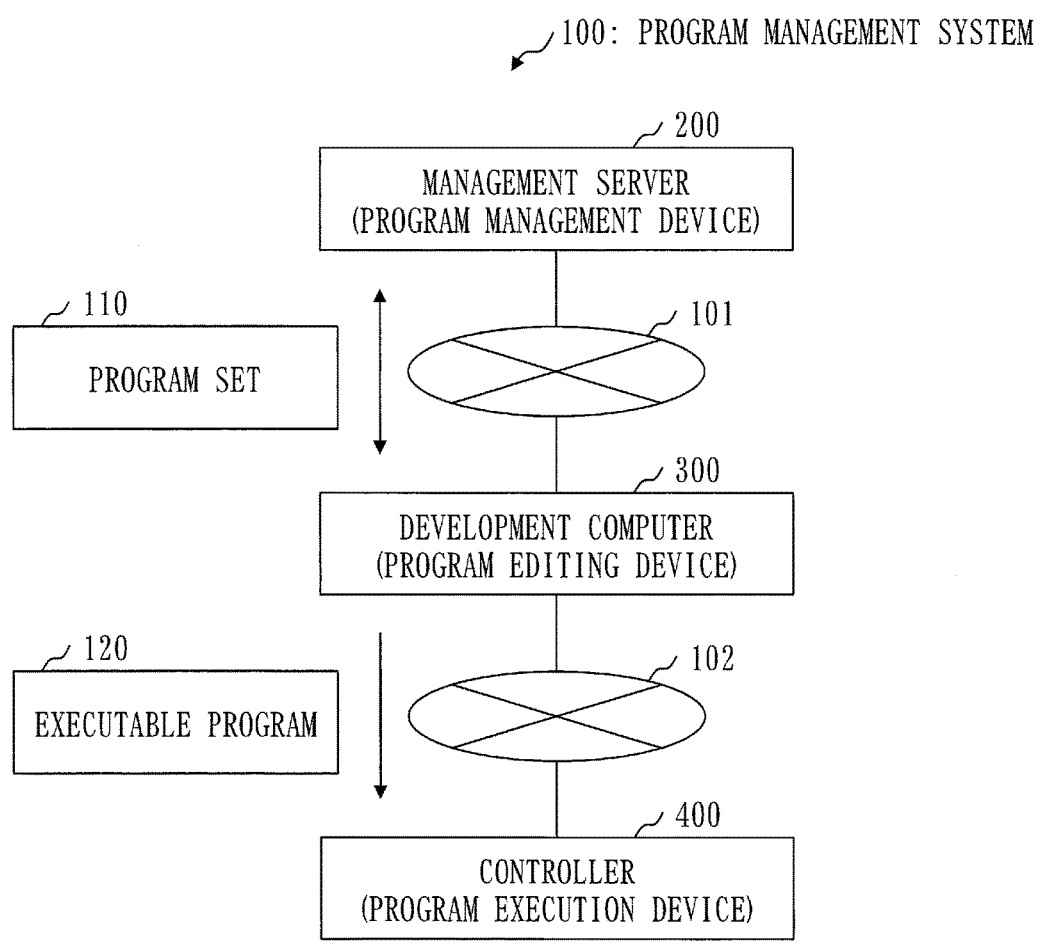
FIG. 1 is a configuration diagram of a program management system 100 according to a first embodiment.

FIG. 1 is a configuration diagram of a program management system 100 according to a first embodiment.

With reference to FIG. 1, the configuration of the program management system 100 according to the first embodiment will be described. However, the configuration of the program management system 100 is not required to be identical to the configuration of FIG. 1.

The program management system 100 is a system to manage a program set 110 including a source program.

The program management system 100 has a management server 200 (an example of a program management device), a development computer 300 (an example of a program editing device), and a controller 400 (an example of a program execution device).

The management server 200 is a device to manage the program set 110. The program set 110 is an electronic file including a source program. For example, the source program is a ladder program written in ladder code.

The development computer 300 is a device to edit the source program included in the program set 110, and convert the source program into an executable program 120. The executable program 120 is a program in an executable form. For example, the executable program is a program written in machine code.

The controller 400 is a device to execute the executable program 120. For example, the controller 400 is a programmable logic controller (PLC).

The development computer 300 communicates with the management server 200 through a communication line 101. For example, the communication line 101 is a network such as a local area network (LAN) or the Internet.

The development computer 300 communicates with the controller 400 through a communication line 102. For example, the communication line 102 is a communication cable such as a USB cable or a LAN cable. USB is an abbreviation for Universal Serial Bus.

Figure 2:
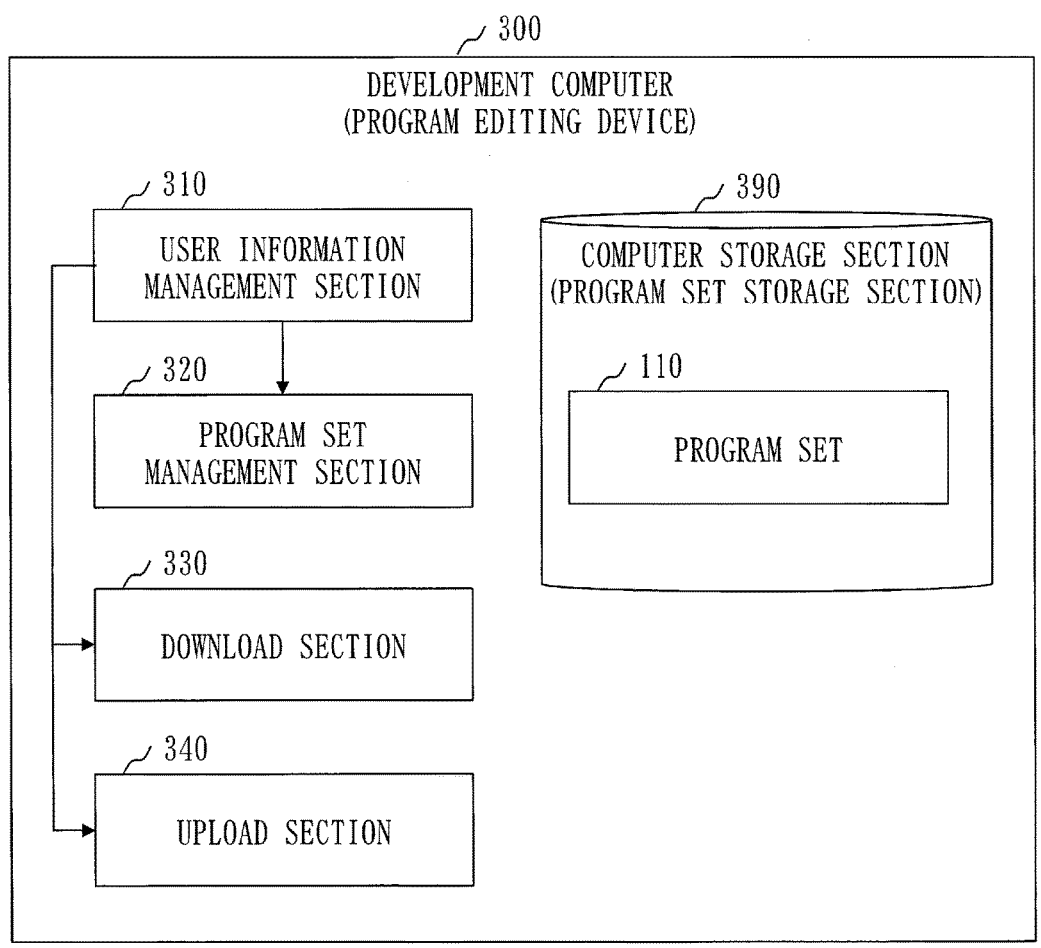
FIG. 2 is a functional configuration diagram of a development computer 300 according to the first embodiment.

FIG. 2 is a functional configuration diagram of the development computer 300 according to the first embodiment.

With reference to FIG. 2, the functional configuration of the development computer 300 according to the first embodiment will be described. However, the functional configuration of the development computer 300 is not required to be identical to the functional configuration of FIG. 2.

The development computer 300 (an example of the program editing device) has a user information management section 310, a program set management section 320, a download section 330, and an upload section 340. The development computer 300 also has a computer storage section 390 (an example of a program set storage section).

The user information management section 310 manages user information which is required for authentication of a user. The user information includes a user ID (an example of a user identifier) to identify a user and a user password associated with the user ID. The ID signifies an identifier.

The program set management section 320 manages the program set 110, such as editing the source program, converting the source program, and registering user information.

The download section 330 downloads the program set 110 from the management server 200.

The upload section 340 uploads the program set 110 including the edited source program to the management server 200.

The computer storage section 390 stores data which is used, generated, or input and output by the development computer 300.

For example, the computer storage section 390 stores the program set 110.

Figure 3:
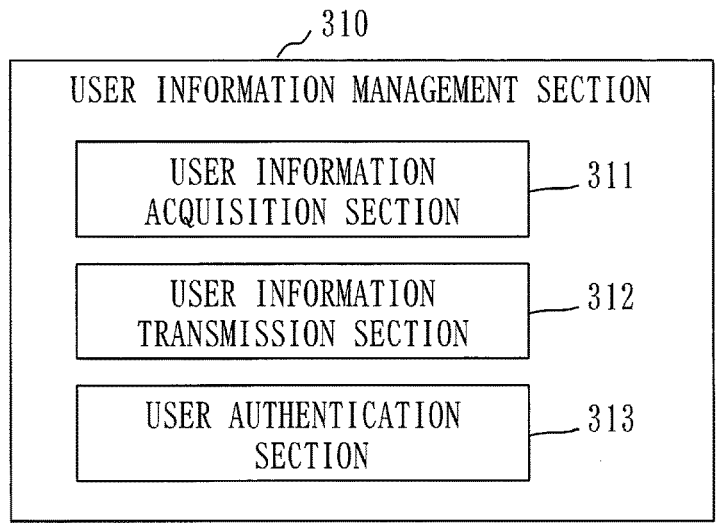
FIG. 3 is a functional configuration diagram of a user information management section 310 of the development computer 300 according to the first embodiment.

FIG. 3 is a functional configuration diagram of the user information management section 310 of the development computer 300 according to the first embodiment.

With reference to FIG. 3, the functional configuration of the user information management section 310 of the development computer 300 according to the first embodiment will be described. However, the functional configuration of the user information management section 310 is not required to be identical to the functional configuration of FIG. 3.

The user information management section 310 has a user information acquisition section 311, a user information transmission section 312, and a user authentication section 313.

The user information acquisition section 311 acquires user information which is input to the development computer 300 by a user.

The user information transmission section 312 transmits the user information acquired by the user information acquisition section 311 to the management server 200.

The user authentication section 313 authenticates the user on the basis of the user information acquired by the user information acquisition section 311 and user information registered in the program set 110.

Figure 4:
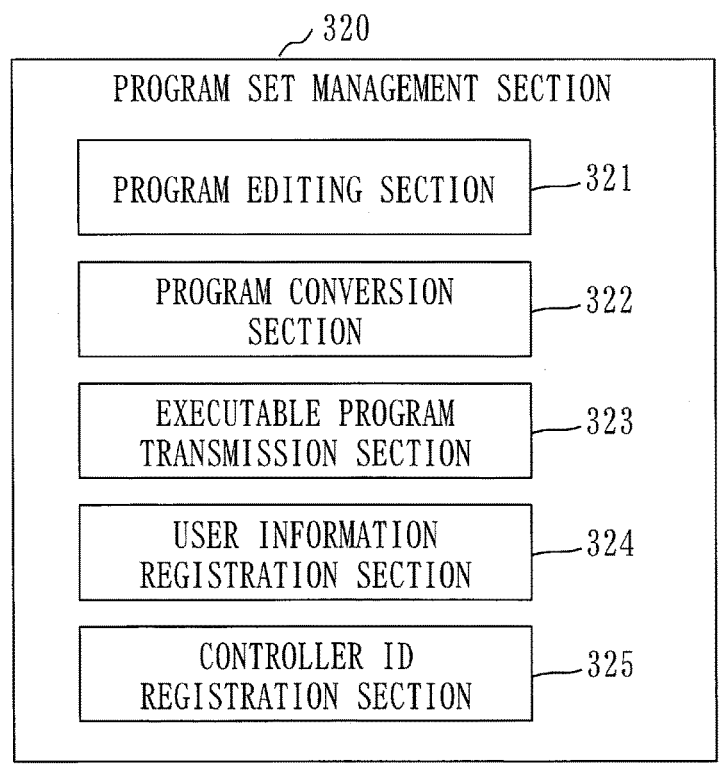
FIG. 4 is a functional configuration diagram of a program set management section 320 of the development computer 300 according to the first embodiment.

FIG. 4 is a functional configuration diagram of the program set management section 320 of the development computer 300 according to the first embodiment.

With reference to FIG. 4, the functional configuration of the program set management section 320 of the development computer 300 according to the first embodiment will be described. However, the functional configuration of the program set management section 320 is not required to be identical to the functional configuration of FIG. 4.

The program set management section 320 has a program editing section 321, a program conversion section 322, an executable program transmission section 323, a user information registration section 324, and a controller ID registration section 325.

The program editing section 321 edits the source program included in the program set 110 in accordance with an instruction from the user.

The program conversion section 322 converts the source program included in the program set 110 into the executable program 120.

The executable program transmission section 323 transmits the executable program 120 to the controller 400.

The user information registration section 324 registers the user information in the program set 110.

The controller ID registration section 325 acquires, from the controller 400, a controller ID (an example of an execution device identifier) to identify the controller 400, and registers the controller ID in the program set 110.

Figure 5:
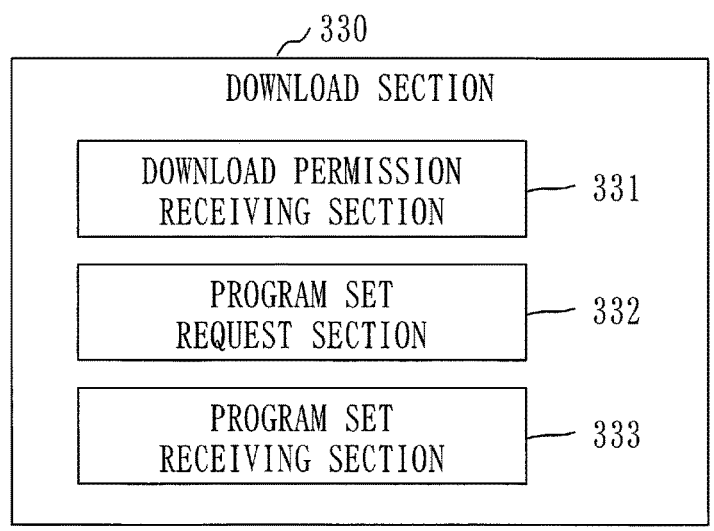
FIG. 5 is a functional configuration diagram of a download section 330 of the development computer 300 according to the first embodiment.

FIG. 5 is a functional configuration diagram of the download section 330 of the development computer 300 according to the first embodiment.

With reference to FIG. 5, the functional configuration of the download section 330 of the development computer 300 according to the first embodiment will be described. However, the functional configuration of the download section 330 is not required to be identical to the functional configuration of FIG. 5.

The download section 330 has a download permission receiving section 331, a program set request section 332, and a program set receiving section 333.

The download permission receiving section 331 receives, from the management server 200, a download permission notification which notifies permission to download the program set 110.

The program set request section 332 requests the program set 110 from the management server 200.

The program set receiving section 333 receives the program set 110 transmitted from the management server 200.

Figure 6:
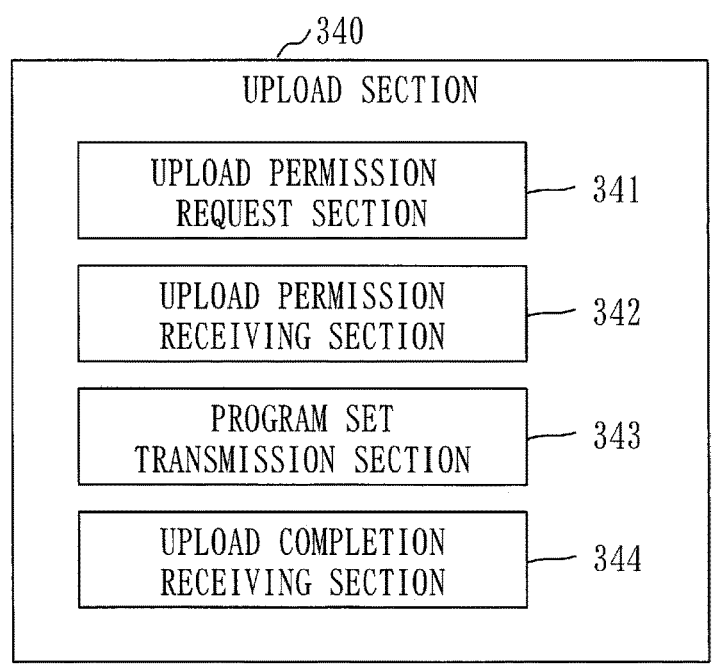
FIG. 6 is a functional configuration diagram of an upload section 340 of the development computer 300 according to the first embodiment.

FIG. 6 is a functional configuration diagram of the upload section 340 of the development computer 300 according to the first embodiment.

With reference to FIG. 6, the functional configuration of the upload section 340 of the development computer 300 according to the first embodiment will be described. However, the functional configuration of the upload section 340 is not required to be identical to the functional configuration of FIG. 6.

The upload section 340 has an upload permission request section 341, an upload permission receiving section 342, a program set transmission section 343, and an upload completion receiving section 344.

The upload permission request section 341 requests, from the management server 200, permission to upload the program set 110.

The upload permission receiving section 342 receives, from the management server 200, an upload permission notification which notifies permission to upload the program set 110.

The program set transmission section 343 transmits the program set 110 to the management server 200.

The upload completion receiving section 344 receives an upload completion notification which notifies completion of the upload of the program set 110.

Figure 7:
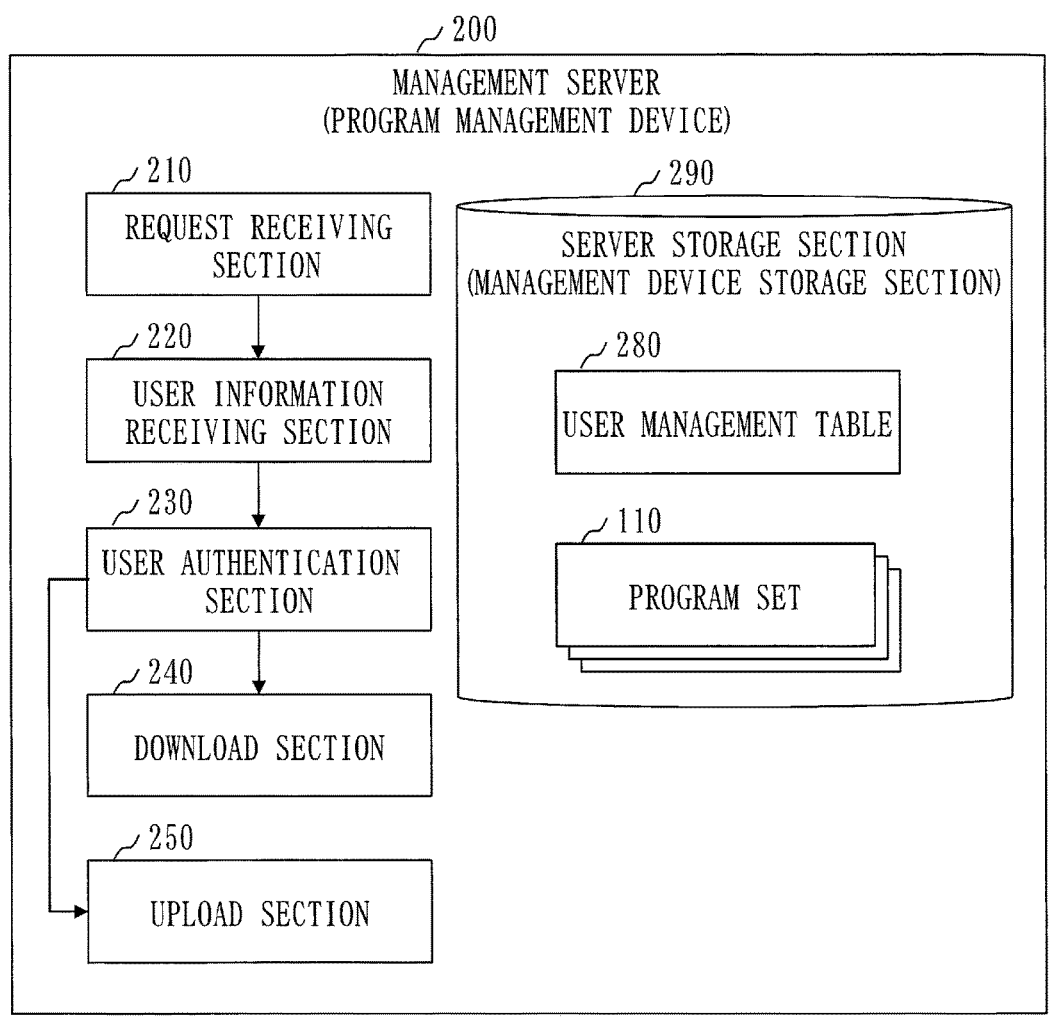
FIG. 7 is a functional configuration diagram of a management server 200 according to the first embodiment.

FIG. 7 is a functional configuration diagram of the management server 200 according to the first embodiment.

With reference to FIG. 7, the functional configuration of the management server 200 according to the first embodiment will be described. However, the functional configuration of the management server 200 is not required to be identical to the functional configuration of FIG. 7.

The management server 200 (an example of the program management device) has a request receiving section 210, a user information receiving section 220, a user authentication section 230, a download section 240, and an upload section 250. The management server 200 also has a server storage section 290 (an example of a management device storage section).

The request receiving section 210 receives a request, such as a program set request or an upload permission request, which is transmitted from the development computer 300.

The user information receiving section 220 receives the user information transmitted from the development computer 300.

The user authentication section 230 authenticates the user of the development computer 300 on the basis of the user information received by the user information receiving section 220 and user information included in a user management table 280.

The download section 240 transmits the program set 110 requested by the development computer 300 to the development computer 300.

The upload section 250 receives the program set 110 transmitted from the development computer 300, and updates the program set 110 stored in the server storage section 290 with the received program set 110. The upload section 250 also updates the user information included in the user management table 280 with the user information included in the received program set 110.

The server storage section 290 stores data which is used, generated, or input and output by the management server 200.

For example, the server storage section 290 stores the user management table 280, the program set 110, and so on.

Figure 8:
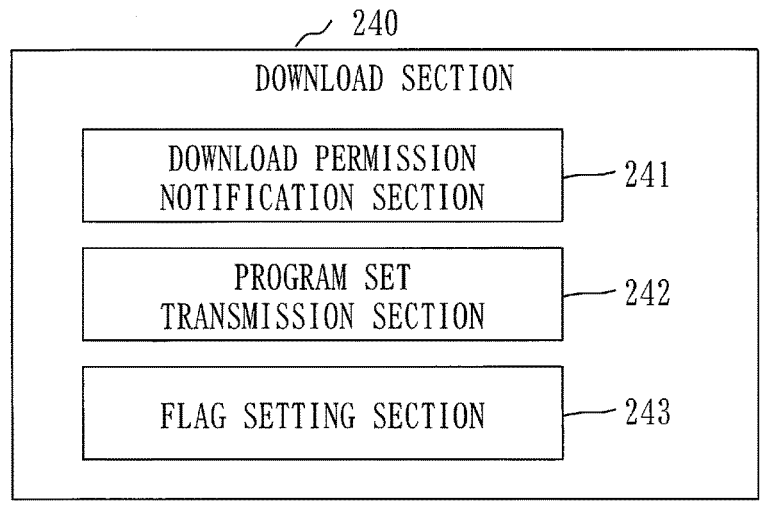
FIG. 8 is a functional configuration diagram of a download section 240 of the management server 200 according to the first embodiment.

FIG. 8 is a functional configuration diagram of the download section 240 of the management server 200 according to the first embodiment.

With reference to FIG. 8, the functional configuration of the download section 240 of the management server 200 according to the first embodiment will be described. However, the functional configuration of the download section 240 is not required to be identical to the functional configuration of FIG. 8.

The download section 240 has a download permission notification section 241, a program set transmission section 242, and a flag setting section 243.

The download permission notification section 241 transmits, to the development computer 300, a download permission notification which notifies permission to download the program set 110.

The program set transmission section 242 transmits, to the development computer 300, the program set 110 requested by the development computer 300.

The flag setting section 243 sets, in the program set 110, an authentication flag which indicates that the user has been authenticated.

Figure 9:
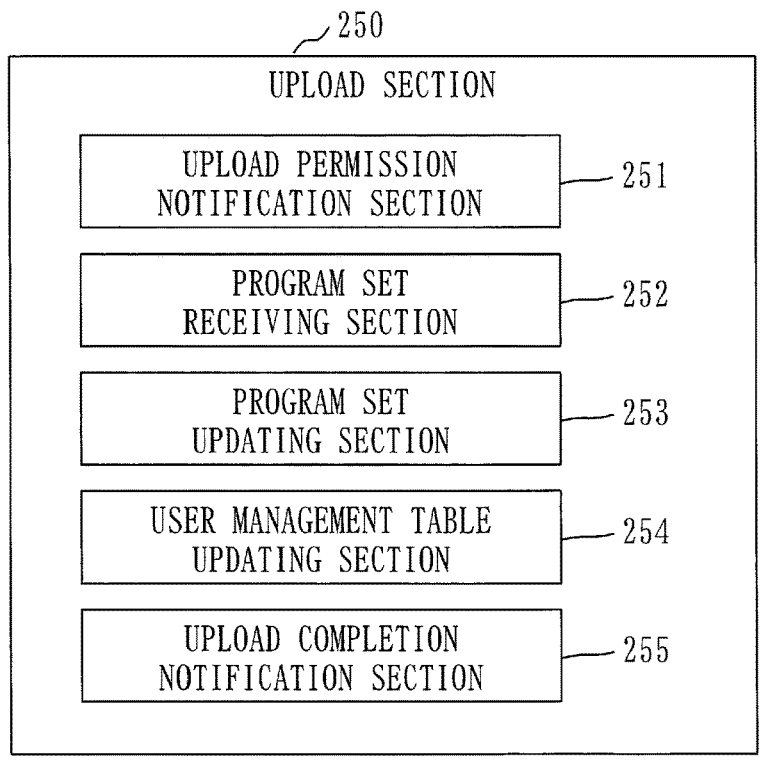
FIG. 9 is a functional configuration diagram of an upload section 250 of the management server 200 according to the first embodiment.

FIG. 9 is a functional configuration diagram of the upload section 250 of the management server 200 according to the first embodiment.

With reference to FIG. 9, the functional configuration of the upload section 250 of the management server 200 according to the first embodiment will be described. However, the functional configuration of the upload section 250 is not required to be identical to the functional configuration of FIG. 9.

The upload section 250 has an upload permission notification section 251, a program set receiving section 252, a program set updating section 253, a user management table updating section 254, and an upload completion notification section 255.

The upload permission notification section 251 transmits, to the development computer 300, an upload permission notification which notifies permission to upload the program set 110.

The program set receiving section 252 receives the program set 110 transmitted from the development computer 300.

The program set updating section 253 updates the program set 110 stored in the server storage section 290 with the received program set 110.

The user management table updating section 254 updates the user information included in the user management table 280 with the user information included in the received program set 110.

The upload completion notification section 255 transmits, to the development computer 300, an upload completion notification which notifies completion of the upload of the program set 110.

Figure 10:
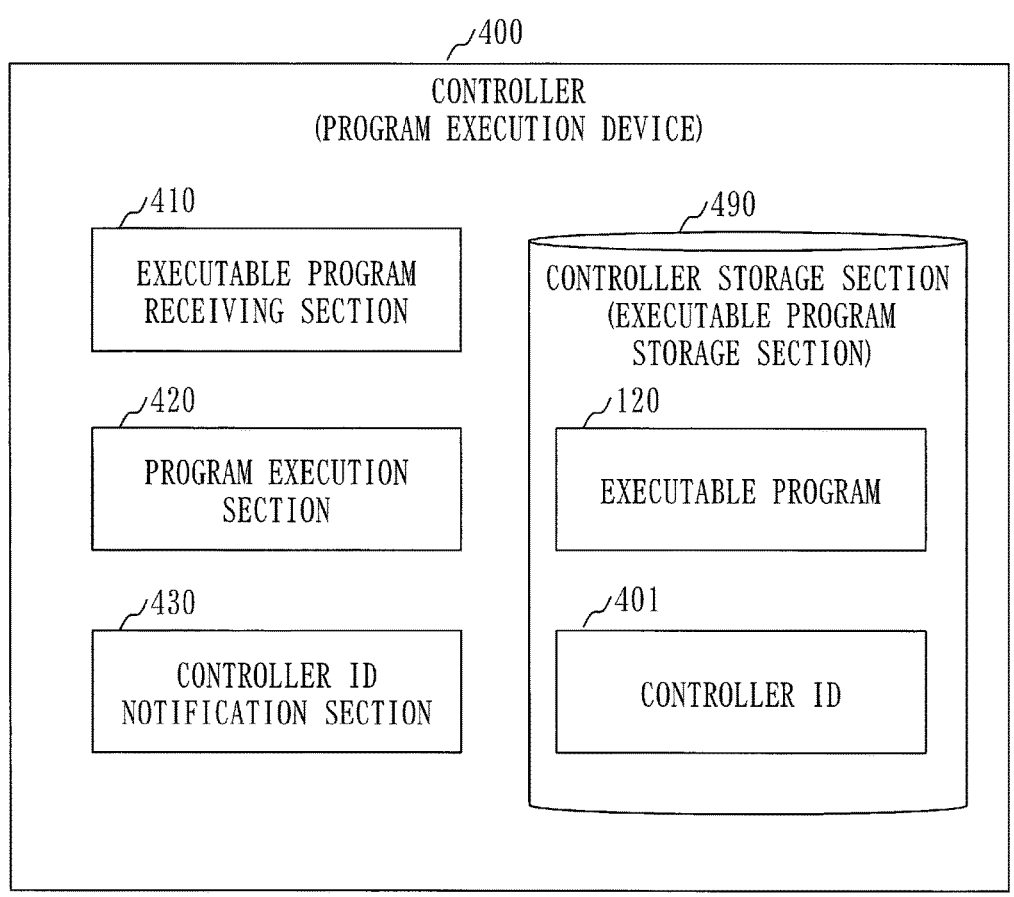
FIG. 10 is a functional configuration diagram of a controller 400 according to the first embodiment.

FIG. 10 is a functional configuration diagram of the controller 400 according to the first embodiment.

With reference to FIG. 10, the functional configuration of the controller 400 according to the first embodiment will be described. However, the functional configuration of the controller 400 is not required to be identical to the functional configuration of FIG. 10.

The controller 400 (an example of the program execution device) has an executable program receiving section 410, a program execution section 420, and a controller ID notification section 430. The controller 400 also has a controller storage section 490 (executable program storage section).

The executable program receiving section 410 receives the executable program 120 transmitted from the development computer 300.

The program execution section 420 executes the executable program 120.

The controller ID notification section 430 notifies the development computer 300 of a controller ID 401.

Figure 11:
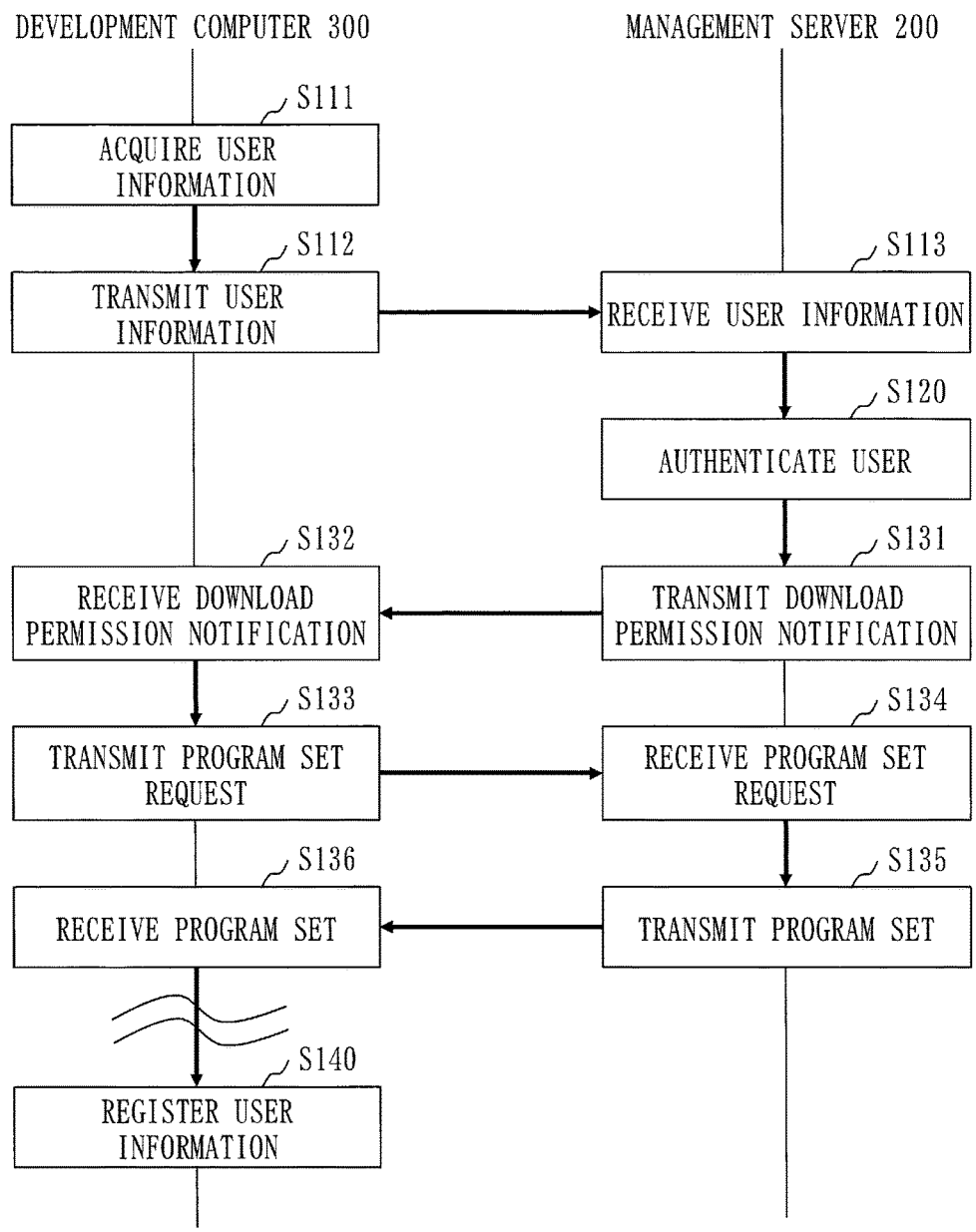
FIG. 11 is a flowchart illustrating a procedure for downloading a program set 110 according to the first embodiment.

FIG. 11 is a flowchart illustrating a procedure for downloading the program set 110 according to the first embodiment.

With reference to FIG. 11, the download of the program set 110 according to the first embodiment will be described. However, the procedure for downloading the program set 110 is not required to be identical to the procedure of FIG. 11.

In S111, the user information acquisition section 311 of the development computer 300 displays a user information input screen for inputting a user ID and a user password on a display device of the development computer 300.

A user inputs a user ID and a user password to the user information input screen, using an input device. For example, the input device includes a keyboard and a mouse.

Then, the user information acquisition section 311 acquires the input user ID (an example of a login identifier) and user password (an example of a login password).

After S111, processing proceeds to S112.

In S112, the user information transmission section 312 of the development computer 300 transmits the user ID and user password acquired in S111 to the management server 200.

After S112, processing proceeds to S113.

In S113, the user information receiving section 220 of the management server 200 receives the user ID and user password transmitted in S112.

After S113, processing proceeds to S120.

Figures 12, 13:
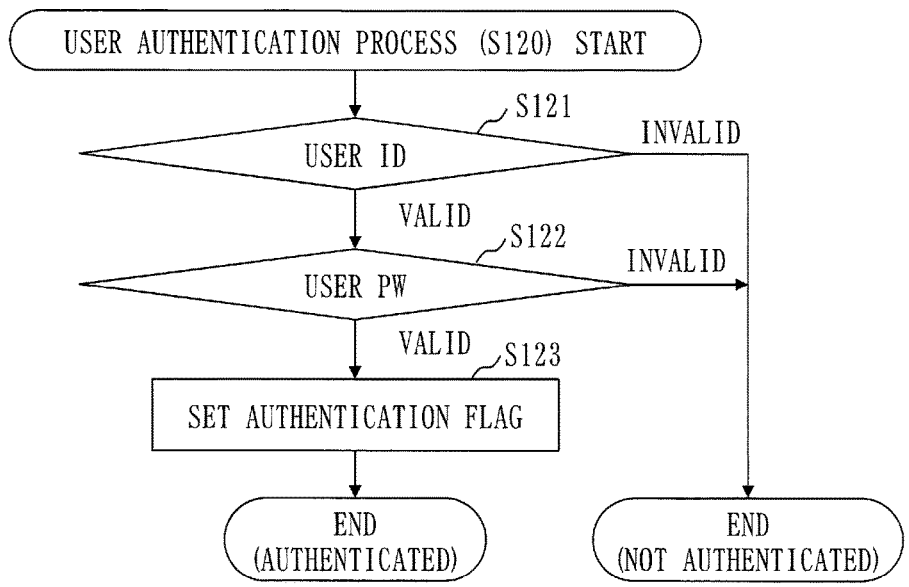
FIG. 12 is a flowchart of a user authentication process (S120) of the management server 200 according to the first embodiment.
FIG. 13 is a diagram illustrating an example of a user management table 280 of the management server 200 according to the first embodiment.

FIG. 12 is a flowchart of a user authentication process (S120) of the management server 200 according to the first embodiment.

With reference to FIG. 12, the user authentication process (S120) of the management server 200 according to the first embodiment will be described. However, the user authentication process (S120) is not required to be identical to the process indicated in FIG. 12.

In S121, the user authentication section 230 determines whether the same user ID as the user ID received in S113 is included in the user management table 280 (see FIG. 13) of the management server 200. Among user IDs included in the user management table 280, the same user ID as the user ID received in S113 will be referred to as an applicable ID.

If the applicable ID is included in the user management table 280 (VALID), processing proceeds to S122.

If the applicable ID is not included in the user management table 280 (INVALID), the user is not authenticated and the user authentication process (S120) terminates.

FIG. 13 is a diagram illustrating an example of the user management table 280 of the management server 200 according to the first embodiment.

With reference to FIG. 13, an example of the user management table 280 of the management server 200 according to the first embodiment will be described.

The user management table 280 has one or more user management records. In FIG. 13, one row corresponds to one user management record.

The user management record includes a user ID. The user management record further includes a user password (user PW), a control ID (CTRL ID), an authentication flag, and so on which are associated with the user ID.

The authentication flag is information indicating whether or not the user identified by the user ID has been authenticated. A flag value indicating that the user has been authenticated will be referred to as an authentication value, and a flag value indicating that the user has not been authenticated will be referred to as a non-authentication value. The initial value of the authentication flag is the non-authentication value.

A user management record including the applicable ID will be referred to as an applicable record.

In S122 (FIG. 12), the user authentication section 230 selects a user management record including the applicable ID (an applicable record) from the user management table 280.

The user authentication section 230 compares the user password received in S113 with the user password included in the applicable record.

If the user password received in S113 is the same as the user password included in the applicable record (VALID), processing proceeds to S123.

If the user password received in S113 is different from the user password included in the applicable record (INVALID), the user is not authenticated and the user authentication process (S120) terminates.

In S123, the user authentication section 230 sets the authentication flag included in the applicable record to the authentication value.

After S123, the user authentication process (S120) terminates.

After the user authentication process (S120), processing proceeds to S131 (FIG. 11).

In S131 (FIG. 11), the download permission notification section 241 of the management server 200 generates a download permission notification, and transmits the download permission notification to the development computer 300.

However, if the user has not been authenticated in the user authentication process (S120), the download permission notification section 241 transmits an error notification to the development computer 300.

After S131, processing proceeds to S132.

In S132, the download permission receiving section 331 of the development computer 300 receives the download permission notification transmitted in S131, and displays a permission message indicating that the download is permitted on the display device of the development computer 300.

However, if the error notification has been transmitted in S131, the download permission receiving section 331 displays an error message and the procedure of FIG. 11 terminates without processing of S133 and thereafter being performed.

After S132, processing proceeds to S133.

In S133, the user inputs, to the development computer 300, a program set name (an example of a program set identifier) that identifies the program set 110 to be downloaded, using the input device.

The program set request section 332 of the development computer 300 acquires the input program set name.

The program set request section 332 generates a program set request including the acquired program set name and the user ID acquired in S111, and transmits the program set request to the management server 200.

After S133, processing proceeds to S134.

In S134, the request receiving section 210 of the management server 200 receives the program set request transmitted in S133.

After S134, processing proceeds to S135.

Figure 14:
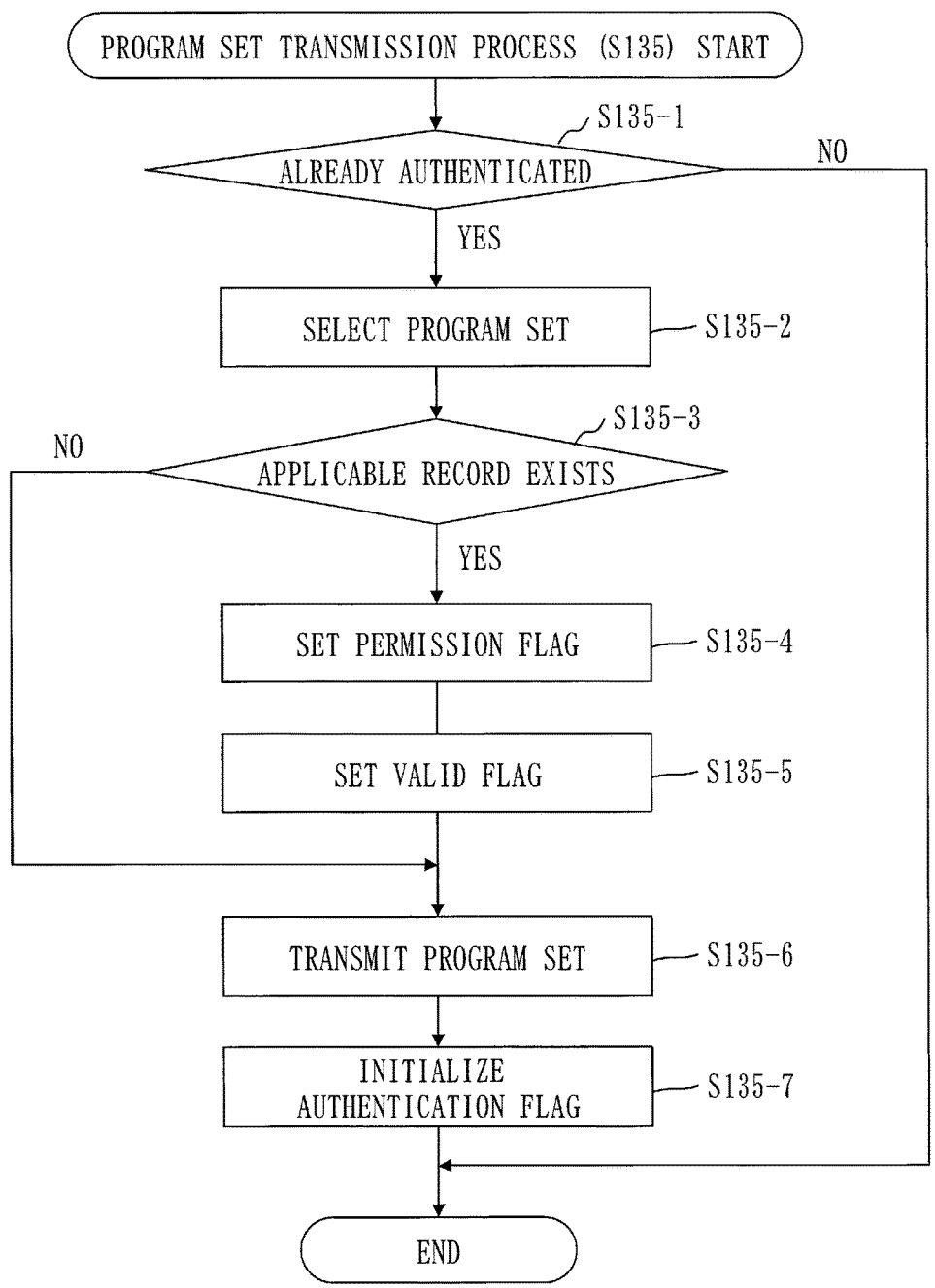
FIG. 14 is a flowchart of a program set transmission process (S135) of the management server 200 according to the first embodiment.

FIG. 14 is a flowchart of a program set transmission process (S135) of the management server 200 according to the first embodiment.

With reference to FIG. 14, the program set transmission process (S135) of the management server 200 according to the first embodiment will be described. However, the program set transmission process (S135) is not required to be identical to the process indicated in FIG. 14.

In S135-1, the program set transmission section 242 selects a user management record including the same user ID as the user ID included in the program set request (an applicable record A) from the user management table 280 of the management server 200.

The program set transmission section 242 determines whether the flag value of the authentication flag included in the applicable record A is the authentication value.

If the flag value of the authentication flag included in the applicable record A in the user management table 280 is the authentication value (YES), processing proceeds to S135-2.

If the flag value of the authentication flag included in the applicable record A is the non-authentication value (NO), the program set transmission section 242 transmits an error notification to the development computer 300, and the program set transmission process (S135) terminates. Then, processing proceeds to S136 (FIG. 11).

In S135-2, the program set transmission section 242 selects the program set 110 that is identified by the program set name included in the program set request (an applicable set) from the server storage section 290.

After S135-2, processing proceeds to S135-3.

Figures 15, 16, 17:
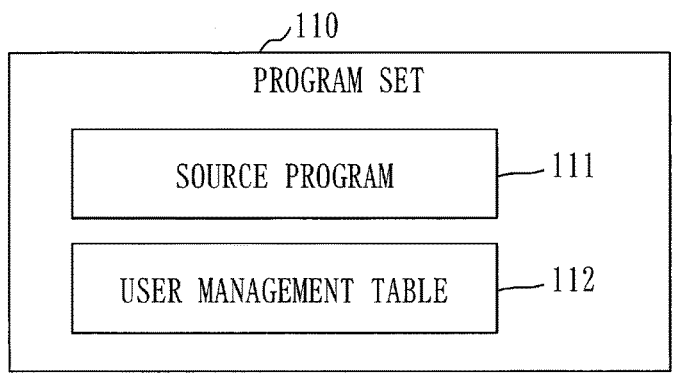
FIG. 15 is a diagram illustrating an example of the program set 110 according to the first embodiment.
FIG. 16 is a diagram illustrating an example of a user management table 112 of the program set 110 according to the first embodiment.
FIG. 17 is a diagram illustrating an example of the user management table 112 of the program set 110 according to the first embodiment.

FIG. 15 is a diagram illustrating an example of the program set 110 according to the first embodiment.

With reference to FIG. 15, an example of the program set 110 according to the first embodiment will be described.

The program set 110 includes a source program 111 and a user management table 112 (see FIG. 16).

FIG. 16 is a diagram illustrating an example of the user management table 112 of the program set 110 according to the first embodiment.

With reference to FIG. 16, an example of the user management table 112 of the program set 110 according to the first embodiment will be described.

The user management table 112 is a table to which a user management record is to be added. The user management table 112 of FIG. 16 is a table in an initial state in which a user management record has not been registered. For example, a user management record is registered in the user management table 112 by the development computer 300 that has downloaded the program set 110.

The user management record includes a user ID. The user management record further includes a user password, a control ID, a permission flag, a valid flag, an update flag, and so on which are associated with the user ID.

The permission flag is information indicating whether or not editing of the source program 111 is permitted. A flag value indicating that editing is permitted will be referred to as a permission value, and a flag value indicating that editing is not permitted will be referred to as a non-permission value. The initial value of the permission flag is the non-permission value.

The valid flag is information indicating whether or not the permission flag is valid. A flag value indicating that the permission flag is valid will be referred to as a valid value, and a flag value indicating that the permission flag is invalid will be referred as an invalid value. The initial value of the valid flag is the invalid value.

The update flag is information indicating whether or not the user management record has been updated. A flag value indicating that an update has been performed will be referred as an update value, and a flag value indicating that an update has not been performed will be referred to as a non-update value. The initial value of the update flag is the non-update value.

In S135-3 (FIG. 14), the flag setting section 243 selects a user management record including the same user ID as the user ID included in the program set request (an applicable record B) from the user management table 112 of the applicable set selected in S135-2.

If the applicable record B exists (YES), processing proceeds to S135-4. In this case, the current download is a second or subsequent download for the user who has requested the applicable set.

If the applicable record B does not exist (NO), processing proceeds to S135-6. In this case, the current download is a first download for the user who has requested the applicable set.

In S135-4, the flag setting section 243 sets the permission flag included in the applicable record B selected in S135-3 to the permission value.

After S135-4, processing proceeds to S135-5.

In S135-5, the flag setting section 243 sets the valid flag included in the applicable record B selected in S135-3 to the valid value.

After S135-5, processing proceeds to S135-6.

In S135-6, the program set transmission section 242 transmits the applicable set selected in S135-2 to the development computer 300.

After S135-6, processing proceeds to S135-7.

In S135-7, the program set transmission section 242 initializes the authentication flag included in the applicable record A selected in S135-1. That is, the program set transmission section 242 sets the authentication flag to the non-authentication value.

After S135-7, the program set transmission process (S135) terminates, and processing proceeds to S136 (FIG. 11).

In S136 (FIG. 11), the program set receiving section 333 of the development computer 300 receives the program set 110 transmitted in S135.

However, if the error notification has been transmitted in S135, the program set receiving section 333 displays an error message on the display device of the development computer 300, and the procedure of FIG. 11 terminates without processing of S136 and thereafter being performed.

After S136, S140 is executed when the user instructs the development computer 300 to newly register user information.

In S140, the user information acquisition section 311 of the development computer 300 displays a user information input screen on the display device of the development computer 300.

The user inputs a user ID and a user password to the user information input screen, using the input device. The user ID and user password may be the same as or different from the user ID and password input in S111.

The user information acquisition section 311 acquires the input user ID and user password.

The user information registration section 324 of the development computer 300 adds a user management record to the user management table 112 of the program set 110, and sets the user ID and the user password in the user management record (see FIG. 17).

FIG. 17 is a diagram illustrating an example of the user management table 112 of the program set 110 according to the first embodiment.

In FIG. 17, the permission flag indicates the non-permission value, the valid flag indicates the invalid value, and the update flag indicates the update value.

After S140, the procedure for downloading the program set 110 (FIG. 11) terminates.

The user information registration section 324 of the development computer 300 may change the user information (user ID, user password) registered in the user management table 112 of the program set 110 in accordance with an instruction from the user.

Figure 18:
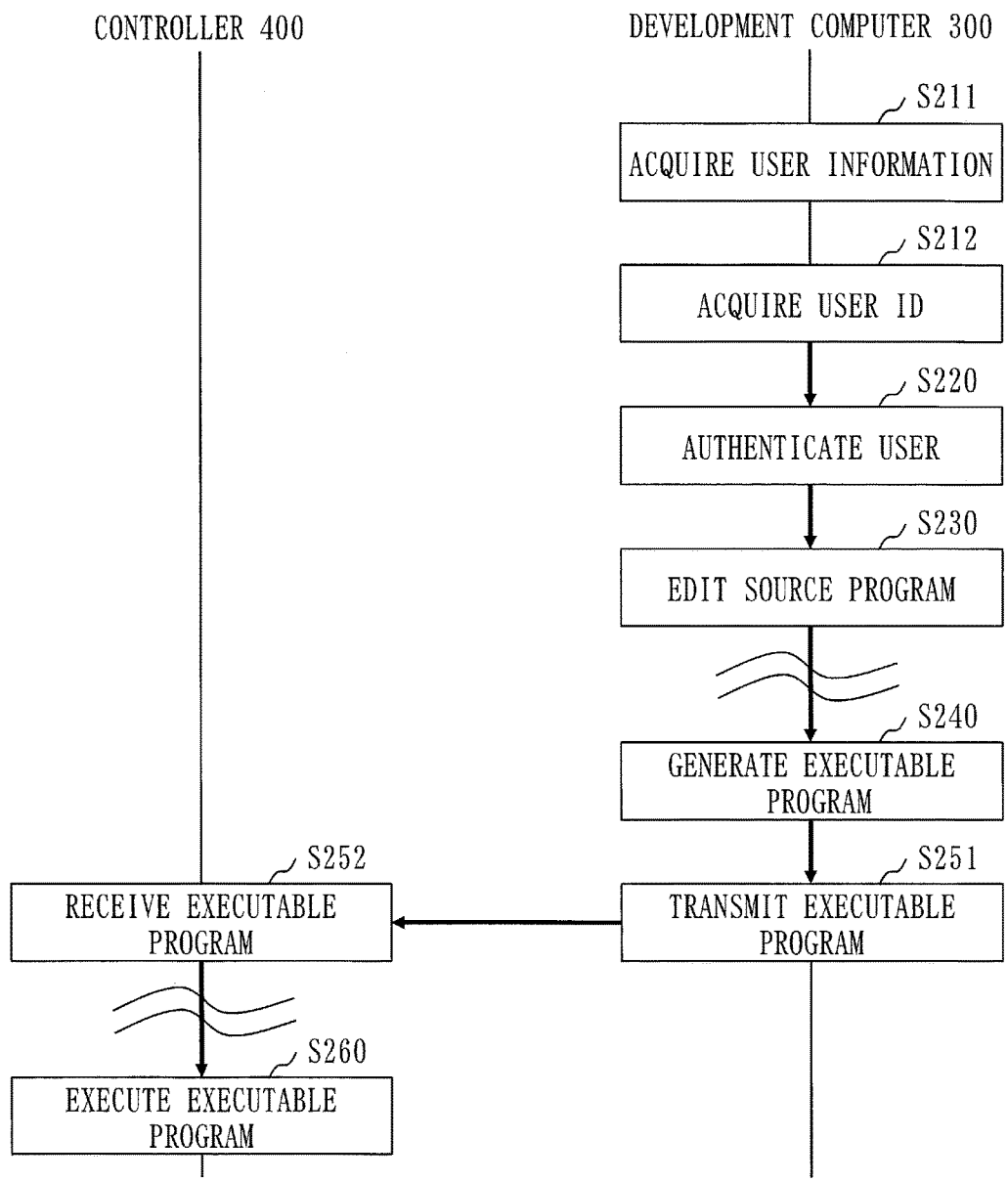
FIG. 18 is a flowchart illustrating a procedure for editing a source program 111 included in the program set 110 according to the first embodiment.

FIG. 18 is a flowchart illustrating a procedure for editing the source program 111 included in the program set 110 according to the first embodiment.

With reference to FIG. 18, the procedure for editing the source program 111 included in the program set 110 according to the first embodiment will be described. However, the procedure for editing the source program 111 is not required to be identical to the procedure of FIG. 18.

In S211, a user of the development computer 300 instructs the development computer 300 to display the source program 111 included in the program set 110, using the input device.

After S211, processing proceeds to S212.

In S212, the user information acquisition section 311 of the development computer 300 displays a user ID input screen for inputting a user ID on the display device of the development computer 300.

The user inputs a user ID to the user ID input screen, using the input device.

Then, the user information acquisition section 311 acquires the input user ID (an example of an authentication identifier).

After S212, processing proceeds to S220.

Figure 19:
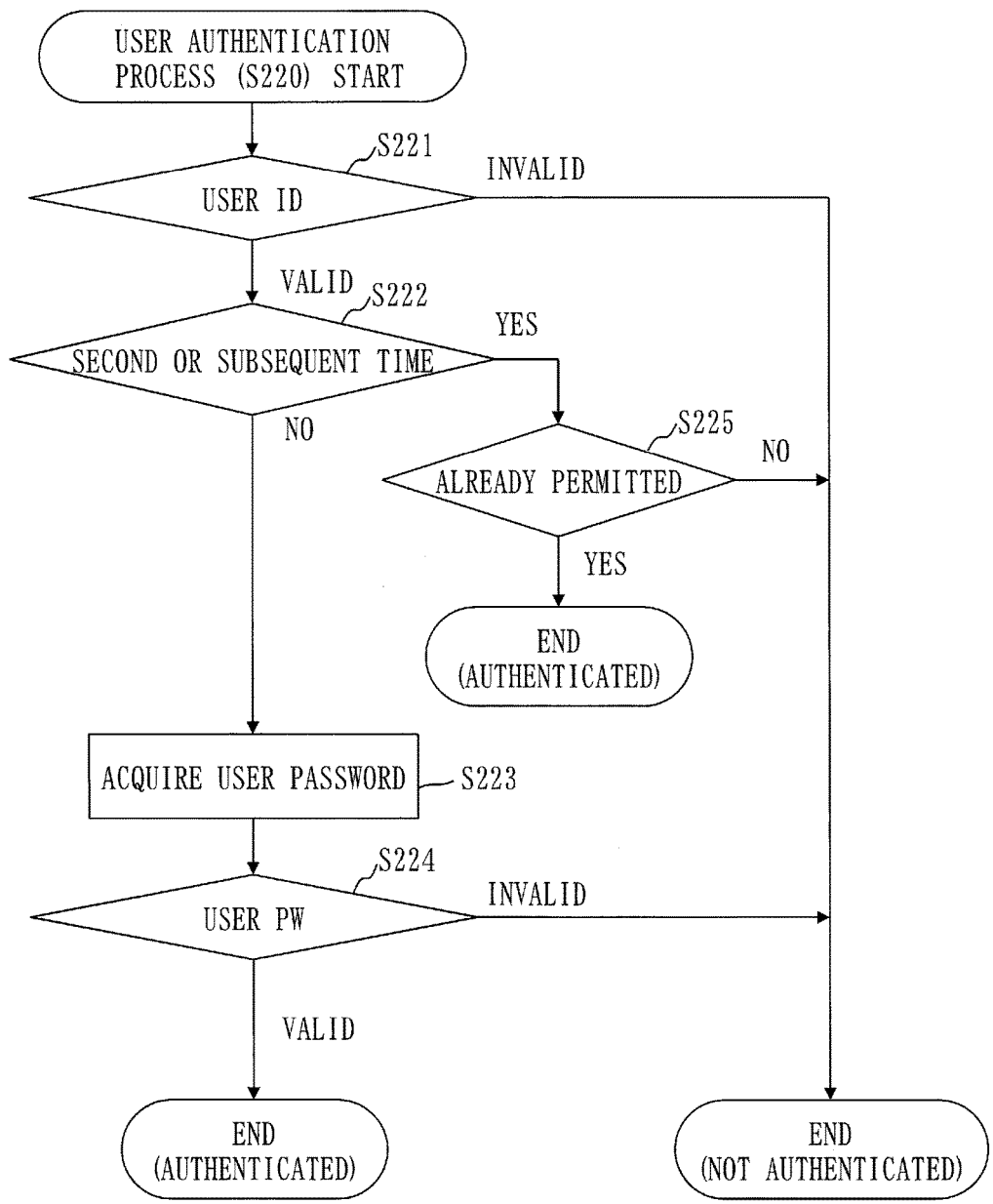
FIG. 19 is a flowchart of a user authentication process (S220) of the development computer 300 according to the first embodiment.

FIG. 19 is a flowchart of a user authentication process (S220) of the development computer 300 according to the first embodiment.

With reference to FIG. 19, the user authentication process (S220) of the development computer 300 according to the first embodiment will be described. However, the user authentication process (S220) is not required to be identical to the process indicated in FIG. 19.

In S221, the user authentication section 313 selects a user management record including the same user ID as the user ID acquired in S212 (an applicable record) from the user management table 112.

If the applicable record exists (VALID), processing proceeds to S222.

If the applicable record does not exist (INVALID), the user is not authenticated and the user authentication process (S220) terminates.

In S222, the user authentication section 313 refers to the valid flag included in the applicable record selected in S221.

If the valid flag included in the applicable record indicates the valid value (YES), processing proceeds to S225. In this case, the current user authentication process (S220) is a process for permitting inspection and editing of the program set 110 in a second or subsequent download.

If the valid flag included in the applicable record indicates the invalid value (NO), processing proceeds to S223. In this case, the current user authentication process (S220) is a process for permitting inspection and editing of the program set 110 in a first download.

In S223, the user information acquisition section 311 displays a user password input screen for inputting a user password.

The user inputs a user password to the user password input screen, using the input device.

The user information acquisition section 311 acquires the input user password (an example of an authentication password).

After S223, processing proceeds to S224.

In S224, the user information acquisition section 311 compares the user password acquired in S223 with the user password included in the applicable record selected in S221.

If the user password acquired in S223 is the same as the user password included in the applicable record selected in S221 (VALID), the user is authenticated and the user authentication process (S220) terminates.

If the user password acquired in S223 is different from the user password included in the applicable record selected in S221 (INVALID), the user is not authenticated and the user authentication process (S220) terminates.

In S225, the user authentication section 313 refers to the permission flag included in the applicable record selected in S221.

If the permission flag included in the applicable record indicates the permission value (YES), the user is authenticated and the user authentication process (S220) terminates. In this case, the inspection and editing of the program set 110 are permitted by the management server 200.

If the permission flag included in the applicable record indicates the non-permission value (NO), the user is not authenticated and the user authentication process (S220) terminates. In this case, the inspection and editing of the program set 110 are not permitted by the management server 200.

After the user authentication process (S220), processing proceeds to S230 (FIG. 18).

In S230 (FIG. 18), the program editing section 321 of the development computer 300 displays the source program 111 included in the program set 110 on the display device of the development computer 300.

The user instructs the development computer 300 to edit the displayed source program 111, using the input device.

The program editing section 321 edits the source program 111 in accordance with an instruction from the user.

However, if the user has not been authenticated in the user authentication process (S220), the program editing section 321 does not display and edit the source program 111.

After S230, S240 is executed when the user instructs the development computer 300 to generate an executable program.

In S240, the program conversion section 322 of the development computer 300 acquires the source program 111 from the program set 110, and converts the source program 111 into the executable program 120. The executable program 120 is thus generated.

After S240, processing proceeds to S251.

In S251, the executable program transmission section 323 of the development computer 300 transmits the executable program 120 generated in S240 to the controller 400.

After S251, processing proceeds to S252.

In S252, the executable program receiving section 410 of the controller 400 receives the executable program 120 transmitted in S251.

After S252, S260 is executed at a specific timing.

In S260, the program execution section 420 of the controller 400 executes the executable program 120 received in S252.

After S260, the procedure for editing the source program 111 (FIG. 18) terminates.

Figure 20:
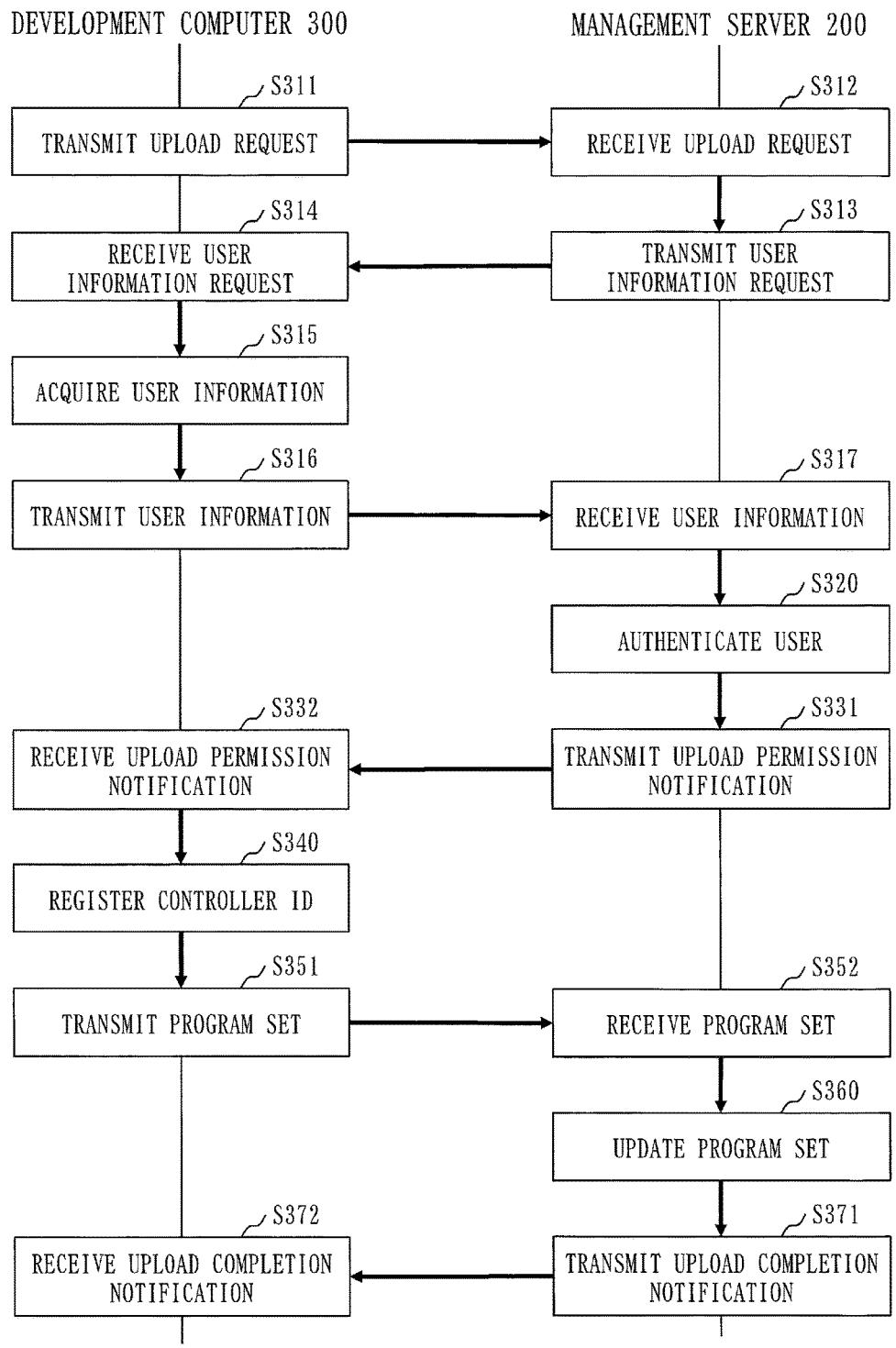
FIG. 20 is a flowchart illustrating a procedure for uploading the program set 110 according to the first embodiment.

FIG. 20 is a flowchart illustrating a procedure for uploading the program set 110 according to the first embodiment.

With reference to FIG. 20, the upload of the program set 110 according to the first embodiment will be described. However, the procedure for uploading the program set 110 is not required to be identical to the procedure of FIG. 20.

In S311, a user of the development computer 300 instructs the development computer 300 to upload the program set 110, using the input device.

The upload permission request section 341 of the development computer 300 generates an upload permission request, and transmits the upload permission request to the management server 200.

After S311, processing proceeds to S312.

In S312, the request receiving section 210 of the management server 200 receives the upload permission request transmitted in S311.

After S312, processing proceeds to S313.

In S313, the user information receiving section 220 of the management server 200 generates a user information request to request user information, and transmits the user information request to the development computer 300.

After S313, processing proceeds to S314.

In S314, the user information acquisition section 311 of the development computer 300 receives the user information request transmitted in S313.

After S314, processing proceeds to S315.

In S315, the user information acquisition section 311 of the development computer 300 displays a user information input screen on the display device of the development computer 300.

The user inputs a user ID and a user password to the user information input screen, using the input device.

Then, the user information acquisition section 311 acquires the input user ID and user password.

After S315, processing proceeds to S316.

In S316, the user information transmission section 312 of the development computer 300 transmits the user ID and user password acquired in S315 to the management server 200.

After S316, processing proceeds to S317.

In S317, the user information receiving section 220 of the management server 200 receives the user ID and user password transmitted in S316.

After S317, processing proceeds to S320.

In S320, the user authentication section 230 of the management server 200 authenticates the user on the basis of the user information (user ID, user password) received in S317 and the user information included in the user management table 280 of the management server 200 (substantially the same as FIG. 12).

If the user is authenticated, processing proceeds to S331.

If the user is not authenticated, the upload of the program set 110 is not permitted, and the procedure of FIG. 20 terminates.

In S331, the upload permission notification section 251 of the management server 200 transmits an upload permission notification to the development computer 300.

After S331, processing proceeds to S332.

In S332, the upload permission receiving section 342 of the development computer 300 receives the upload permission notification transmitted in S331.

After S332, processing proceeds to S340.

Figures 21, 22:
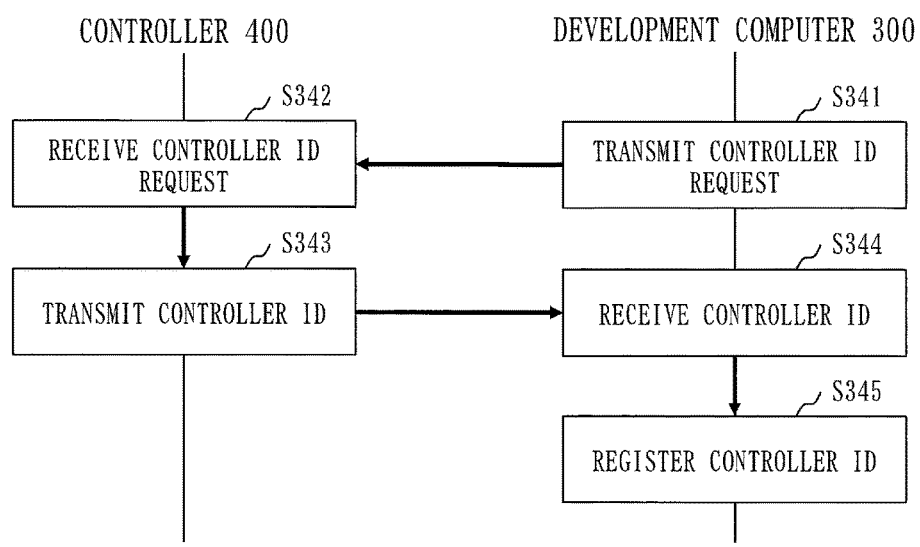
FIG. 21 is a flowchart of a controller ID registration process (S340) according to the first embodiment.
FIG. 22 is a diagram illustrating an example of the user management table 112 of the program set 110 according to the first embodiment.

FIG. 21 is a flowchart of a controller ID registration process (S340) according to the first embodiment.

With reference to FIG. 21, the controller ID registration process (S340) according to the first embodiment will be described. However, the controller ID registration process (S340) is not required to be identical to the process indicated in FIG. 21.

In S341, the controller ID registration section 325 of the development computer 300 generates a controller ID request to request the controller ID 401, and transmits the controller ID request to the controller 400.

After S341, processing proceeds to S342.

In S342, the controller ID notification section 430 of the controller 400 receives the controller ID request transmitted in S341.

After S342, processing proceeds to S343.

In S343, the controller ID notification section 430 of the controller 400 transmits the controller ID 401 to the development computer 300.

After S343, processing proceeds to S344.

In S344, the controller ID registration section 325 of the development computer 300 receives the controller ID 401 transmitted in S343.

After S344, processing proceeds to S345.

In S345, the controller ID registration section 325 of the development computer 300 selects a user management record including the same user ID as the user ID acquired in S315 (FIG. 20) (an applicable record) from the user management table 112 of the program set 110.

Then, the controller ID registration section 325 sets the controller ID 401 received in S344 in the applicable record (see FIG. 22).

FIG. 22 is a diagram illustrating an example of the user management table 112 of the program set 110 according to the first embodiment.

After S345, the controller ID registration process (S340) terminates, and processing proceeds to S351 (see FIG. 20).

In a case where the program set 110 includes the controller ID 401 in addition to the source program 111 and the user management table 112, it is not required that the controller ID registration process (S340) be executed.

In S351 (see FIG. 20), the program set transmission section 343 of the development computer 300 transmits the program set 110 to the management server 200.

The user management table 112 of the program set 110 includes the user ID, and also includes the user password and the controller ID which are associated with the user ID (see FIG. 22).

After S351, processing proceeds to S352.

In S352, the program set receiving section 252 of the management server 200 receives the program set 110 transmitted in S351.

After S352, processing proceeds to S360.

FIG. 23 is a flowchart of a program set update process (S360) according to the first embodiment.

With reference to FIG. 23, the program set update process (S360) according to the first embodiment will be described. However, the program set update process (S360) is not required to be identical to the process indicated in FIG. 23.

In S361, the program set updating section 253 selects a user management record including the same user ID as the user ID received in S317 (see FIG. 20) (an applicable record) from the user management table 280 of the management server 200.

The program set updating section 253 refers to the authentication flag included in the applicable record.

If the authentication flag indicates the authentication value (YES), processing proceeds to S362.

If the authentication flag is the non-authentication value (NO), the program set 110 is not updated and the program set update process (S360) terminates.

In S362, the program set updating section 253 selects the program set 110 identified by the same program set name as the program set name of the program set 110 received in S352 (FIG. 20) (an applicable set) from the server storage section 290.

Then, the program set updating section 253 updates the applicable set with the program set 110 received in S352.

After S362, processing proceeds to S363.

In S363, the user management table updating section 254 selects a user management record including the update flag indicating the update value (an applicable record) from the user management table 112 included in the program set 110 received in S352.

Then, the user management table updating section 254 updates the user ID included in the applicable record in the user management table 280 of the management server 200 (see S361) with the user ID included in the applicable record in the user management table 112 of the program set 110.

After S363, processing proceeds to S364.

In S364, the user management table updating section 254 updates the user password included in the applicable record in the user management table 280 of the management server 200 with the user password included in the applicable record in the user management table 112 of the program set 110.

After S364, processing proceeds to S365.

In S365, the user management table updating section 254 registers, in the applicable record in the user management table 280 of the management server 200, the controller ID included in the applicable record in the user management table 112 of the program set 110.

After S365, processing proceeds to S366.

In S366, the user management table updating section 254 initializes the authentication flag included in the applicable record in the user management table 280 of the management server 200. That is, the user management table updating section 254 sets the authentication flag to the non-authentication value.

After S366, the program set update process (S360) terminates, and processing proceeds to S371 (see FIG. 20).

FIG. 24 is a diagram illustrating an example of the user management table 280 of the management server 200 according to the first embodiment.

For example, the user management table 280 of the management server 200 is updated on the basis of the user management table 112 (see FIG. 22) of the program set 110, as indicated in FIG. 24.

In S371 (see FIG. 20), the upload completion notification section 255 of the management server 200 generates an upload completion notification, and transmits the upload completion notification to the development computer 300.

However, if the program set 110 has not been updated in S360, the upload completion notification section 255 transmits an error notification to the development computer 300.

After S371, processing proceeds to S372.

In S372, the upload completion receiving section 344 of the development computer 300 receives the upload completion notification transmitted in S371, and displays a completion message indicating that the upload of the program set 110 has been completed on the display device of the development computer 300.

However, if the error notification has been transmitted in S371, the upload completion receiving section 344 displays an error message on the display device of the development computer 300.

After S372, the procedure for uploading the program set 110 (FIG. 20) terminates.

Figure 25:
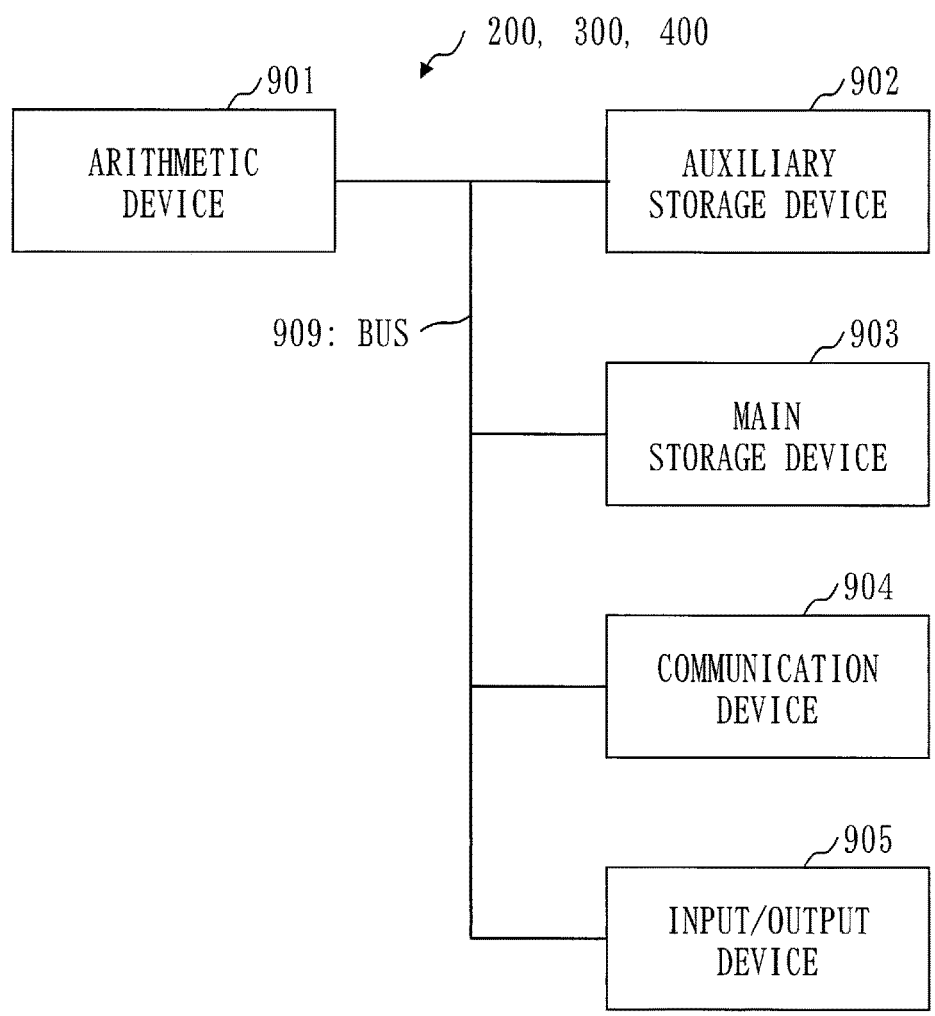
FIG. 25 is a hardware configuration diagram of the management server 200, the development computer 300, and the controller 400 according to the first embodiment.

FIG. 25 is a hardware configuration diagram of the management server 200, the development computer 300, and the controller 400 according to the first embodiment.

With reference to FIG. 25, the hardware configuration of the management server 200, the development computer 300, and the controller 400 according to the first embodiment will be described. However, the hardware configuration of the management server 200, the development computer 300, and the controller 400 is not required to be identical to the configuration indicated in FIG. 25.

The management server 200, the development computer 300, and the controller 400 are each a computer that includes an arithmetic device 901, an auxiliary storage device 902, a main storage device 903, a communication device 904, and an input/output device 905.

The arithmetic device 901, the auxiliary storage device 902, the main storage device 903, the communication device 904, and the input/output device 905 are connected to a bus 909.

The arithmetic device 901 is a CPU (Central Processing Unit) to execute programs.

The auxiliary storage device 902 is, for example, a ROM (Read Only Memory), a flash memory, or a hard disk device.

The main storage device 903 is, for example, a RAM (Random Access Memory).

The communication device 904 communicates in a wired or wireless manner through the Internet, a LAN (local area network), a telephone network, or other networks.

The input/output device 905 is, for example, a mouse, a keyboard, and a display device.

The programs are stored in the auxiliary storage device 902.

For example, an operating system (OS) is stored in the auxiliary storage device 902. Programs for implementing the functions each described as a "section" are also stored in the auxiliary storage device 902.

The programs are stored in the auxiliary storage device 902 and loaded into the main storage device 903 to be read by the arithmetic device 901 and executed by the arithmetic device 901.

Information, data, files, signal values, or variable values indicating results of processing such as "assess", "determine", "extract", "detect", "set", "register", "select", "generate", "input", "output", and so on are stored in the main storage device 903 or the auxiliary storage device 902.

The first embodiment provides the following effects, for example.

When the permission flag indicating permission for editing is set in the user management table 112 included in the program set 110, the user can edit the source program 111 included in the program set 110 without inputting the user password to the development computer 300 (see S225 of FIG. 19). That is, the program management system 100 can improve user-friendliness when the source program 111 is to be edited.

When the development computer 300 is disconnected from the communication line 101 and cannot communicate with the management server 200, or when the permission flag indicating permission for editing is not set in the source program 111, the user cannot edit the source program 111. That is, the program management system 100 can restrict the inspection and editing of the source program 111 and prevent leakage of the source program 111.

The first embodiment is an example of an embodiment of the program management system 100.

That is, the program management system 100 may be configured without some of the composing elements described in the first embodiment. The program management system 100 may have a composing element not described in the first embodiment.

The processing procedures described in the first embodiment using the flowcharts or the like are examples of processing procedures of methods and programs according to the first embodiment. The methods and programs according to the first embodiment may be implemented with processing procedures that are partially different from the processing procedures described in the first embodiment.

In the first embodiment, each "section" may be read as a "process", a "step", a "program", a "device", and so on.

REFERENCE SIGNS LIST

100: program management system, 101: communication line, 102: communication line, 110: program set, 111: source program, 112: user management table, 120: executable program, 200: management server, 210: request receiving section, 220: user information receiving section, 230: user authentication section, 240: download section, 241: download permission notification section, 242: program set transmission section, 243: flag setting section, 250: upload section, 251: upload permission notification section, 252: program set receiving section, 253: program set updating section, 254: user management table updating section, 255: upload completion notification section, 280: user management table, 290: server storage section, 300: development computer, 310: user information management section, 311: user information acquisition section, 312: user information transmission section, 313: user authentication section, 320: program set management section, 321: program editing section, 322: program conversion section, 323: executable program transmission section, 324: user information registration section, 325: controller ID registration section, 330: download section, 331: download permission receiving section, 332: program set request section, 333: program set receiving section, 340: upload section, 341: upload permission request section, 342: upload permission receiving section, 343: program set transmission section, 344: upload completion receiving section, 390: computer storage section, 400: controller, 401: controller ID, 410: executable program receiving section, 420: program execution section, 430: controller ID notification section, 490: controller storage section, 901: arithmetic device, 902: auxiliary storage device, 903: main storage device, 904: communication device, 905: input/output device, 909: bus

The invention claimed is:

1. A program editing device comprising:
a program set storage section to store a program set including a program, a user identifier, and a user password associated with the user identifier;
a user information acquisition section to acquire an authentication identifier of a user and an authentication password of the user;
a user authentication section to authenticate the user when the authentication password acquired by the user information acquisition section is same as a user password associated with a same user identifier as the authentication identifier acquired by the user information acquisition section; and
a program editing section to edit the program included in the program set on a basis of an instruction from the user when the user has been authenticated by the user authentication section,
wherein the program set includes a permission flag and a valid flag which are associated with the user identifier, and
wherein the user authentication section authenticates the user when a valid flag associated with the same user identifier as the authentication identifier indicates invalid and the authentication password is same as the user password associated with the same user identifier as the authentication identifier, or when said valid flag indicates valid and a permission flag associated with the same user identifier as the authentication identifier indicates permission.

2. The program editing device according to claim 1,
wherein the user information acquisition section acquires, as user information, a login identifier of the user and a login password of the user,
the program editing device further comprising:
a user information transmission section to transmit the user information acquired by the user information acquisition section to a program management device;
an upload permission receiving section to receive an upload permission notification transmitted from the program management device when the user has been authenticated on a basis of the user information transmitted by the user information transmission section; and
a program set transmission section to transmit the program set including the program edited by the program editing section to the program management device when the upload permission notification has been received by the upload permission receiving section.

3. A program management device comprising:
a management device storage section to store a program set including a program and store a user management table including a user identifier and a user password associated with the user identifier;
a user information receiving section to receive a login identifier of a user and a login password of the user from a program editing device to edit the program;
a user authentication section to authenticate the user when the login password received by the user information receiving section is same as a user password associated with a same user identifier as the login identifier received by the user information receiving section;
an upload permission notification section to transmit, to the program editing device, an upload permission notification which notifies upload permission when the user has been authenticated by the user authentication section;

a program set receiving section to receive a program set including a program, a user identifier, and a user password from the program editing device;

a program set updating section to update the program set stored in the management device storage section, with the program set received by the program set receiving section; and a user management table updating section to update the same user identifier as the login identifier among user identifiers included in the user management table and the user password associated with the same user identifier as the login identifier, with the user identifier and the user password which are included in the program set received by the program set receiving section.

4. The program management device according to claim 3, wherein the user management table includes an authentication flag associated with the user identifier, wherein the user authentication section sets an authentication flag associated with the same user identifier as the login identifier to an authentication value indicating authentication when the user has been authenticated, wherein the program set updating section updates the program set when the authentication flag associated with the same user identifier as the login identifier indicates the authentication value, and wherein the user management table updating section updates the user identifier and the user password when said authentication flag indicates the authentication value.

5. The program management device according to claim 3, wherein the user information receiving section receives a new login identifier and a new login password from the program editing device, and wherein the user authentication section authenticates the user when the new login password is same as a user password associated with a same user identifier as the new login identifier, the program management device further comprising:

a flag setting section to set, in the updated program set, a permission flag indicating permission to edit the program included in the updated program set when the user has been authenticated; and a program set transmission section to transmit the updated program set in which the permission flag has been set to the program editing device.

6. A non-transitory computer readable medium storing a program management program using a storage section to store a program set including a program and store a user management table including a user identifier and a user password associated with the user identifier, the program management program causing a computer to execute:

a user information receiving process of receiving a login identifier of a user and a login password of the user from a program editing device to edit the program;

a user authentication process of authenticating the user when the login password received by the user information receiving process is same as a user password associated with a same user identifier as the login identifier received by the user information receiving process;

an upload permission notification process of transmitting, to the program editing device, an upload permission notification which notifies upload permission when the user has been authenticated by the user authentication process;

a program set receiving process of receiving a program set including a program, a user identifier, and a user password from the program editing device;

a program set update process of updating the program set stored in the storage section, with the program set received by the program set receiving process; and a user management table update process of updating the same user identifier as the login identifier among user identifiers included in the user management table and the user password associated with the same user identifier as the login identifier, with the user identifier and the user password which are included in the program set received by the program set receiving process.

* * * * *